US008984728B2

(12) United States Patent
Chen et al.

(10) Patent No.: US 8,984,728 B2
(45) Date of Patent: Mar. 24, 2015

(54) DRAWING DEVICE

(75) Inventors: Lung-Shan Chen, Taichung (TW); Lien-Chin Chen, Taichung (TW); Ching-Fang Chen, Taichung (TW)

(73) Assignee: Shine Yen Industrial Co., Ltd., Taichung (TW)

( * ) Notice: Subject to any disclaimer, the term of this patent is extended or adjusted under 35 U.S.C. 154(b) by 518 days.

(21) Appl. No.: 13/468,039

(22) Filed: May 10, 2012

(65) Prior Publication Data

US 2012/0284982 A1 Nov. 15, 2012

(30) Foreign Application Priority Data

May 12, 2011 (TW) ............................ 100208463 U

(51) Int. Cl.
*B23P 19/04* (2006.01)
*B25B 27/02* (2006.01)

(52) U.S. Cl.
CPC .................................... *B25B 27/023* (2013.01)
USPC ............................................... 29/258; 29/255

(58) Field of Classification Search
CPC ......... B23P 19/04; B23P 19/06; B23Q 5/404; B25B 5/00; B25B 5/10
USPC ........... 29/258, 244, 255, 278, 270, 238–239; 269/3, 6
See application file for complete search history.

(56) References Cited

U.S. PATENT DOCUMENTS

| | | | | |
|---|---|---|---|---|
| 4,771,528 | A * | 9/1988 | Stromberg | 29/259 |
| 5,557,833 | A * | 9/1996 | Pool | 29/261 |
| 5,896,639 | A * | 4/1999 | Chen | 29/261 |
| 7,216,409 | B1 * | 5/2007 | Chiu et al. | 29/259 |
| 7,272,886 | B2 * | 9/2007 | Thomson | 29/724 |
| 7,653,975 | B2 * | 2/2010 | Hu | 29/259 |
| 7,908,724 | B2 * | 3/2011 | Isabelle | 29/260 |
| 7,996,972 | B2 * | 8/2011 | Hu | 29/252 |
| 8,079,123 | B2 * | 12/2011 | Lin | 29/259 |
| 8,365,379 | B2 * | 2/2013 | Mueller | 29/261 |
| 8,656,569 | B2 * | 2/2014 | Klann | 29/263 |
| 8,826,505 | B2 * | 9/2014 | Dines et al. | 29/244 |
| 2008/0178455 | A1 * | 7/2008 | Cox et al. | 29/464 |
| 2012/0284982 | A1 * | 11/2012 | Chen et al. | 29/258 |

* cited by examiner

*Primary Examiner* — Lee D Wilson

(57) ABSTRACT

A drawing device of the present invention includes a first driving element, a bolt, a plurality of second driving elements, and a plurality of clipping rods. The first driving element drives the second driving elements to rotate simultaneously, so that the clipping rods are able to be rotated and operated. Also, a hook portion of each clipping rod is able to hook to a bottom of objects to be drawn out, and the bolt is disposed on a threaded hole of the first driving element and abuts against the objects to be drawn out. At the same time, the clipping rods are moved outward.

10 Claims, 8 Drawing Sheets

DRAWING DEVICE

BACKGROUND OF THE INVENTION

1. Field of the Invention

The present invention relates to drawing device.

2. Description of the Prior Art

A conventional drawing device is shown in FIGS. 8 and 9. A hook portion 44 of each of the two linkage rod 42 abuts against a side of an object 45 to be drawn out, and a bolt is screwed to abut against a fixed end 46 on which the object 45 is disposed. At the same time, relative to the bolt being screwed downward, a body 40 is moved upward and removes the object 45 from the fixed end 46.

However, all the elements of the previous drawing device are linked together in a pivot manner, so that hooking to the bottom of the object and positioning are difficult. Also, an object in a narrow space is further difficult to be removed.

Moreover, the two clipping rods 43 are arc-shaped and bent outward, so that the drawing device is hard to enter a narrow space to operate. Even if the drawing device is able to be placed into a narrow space forcedly, position of hooking may be deviated due to the slanting screwing of the bolt 41. Thus, the object is unable to be removed from the fixed end.

The present invention is, therefore, arisen to obviate or at least mitigate the above mentioned disadvantages.

SUMMARY OF THE INVENTION

The main object of the present invention is to provide a drawing device, having a plurality of clipping rods to provide easy clamping at numeral co-planar positions.

To achieve the above and other objects, a drawing device of the present invention includes a first driving element, a bolt, a plurality of second driving elements, and a plurality of clipping rods.

The first driving element has a first driving portion and an axle portion, and the axle portion axially forms a threaded hole.

The bolt is screwed with the threaded hole.

The second driving rods are spacedly and annularly disposed on and abut against an outer peripheral face of the first driving portion.

The clipping rods are rotatably disposed on the second driving elements respectively, and each clipping rod forms a hook portion.

When operating, the bolt is able to drive the axle portion and the first driving portion to rotate, and the first driving portion further drives the second driving elements to rotate. And then, the second driving elements drive the clipping rods to move between a first position and a second position respectively. Also, each clipping rod is able to turn relative to one of the second driving elements freely, so that the hook portion of each clipping rod is able to face outward or inward alternatively.

Thereby, the clipping rods are able to clamp from numeral co-planar positions, and stability and safety are both improved.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
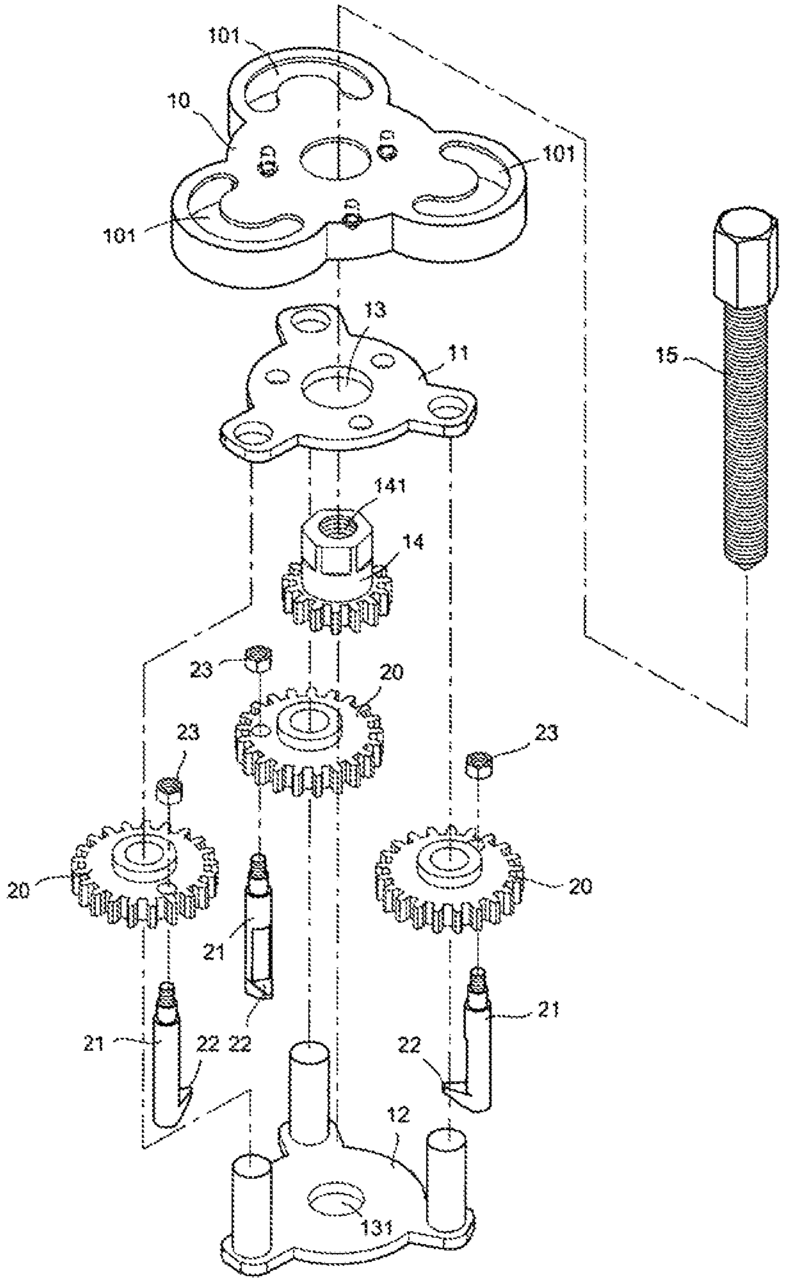
FIG. 1 is a breakdown drawing showing a first embodiment of the present invention.
Figure 2:
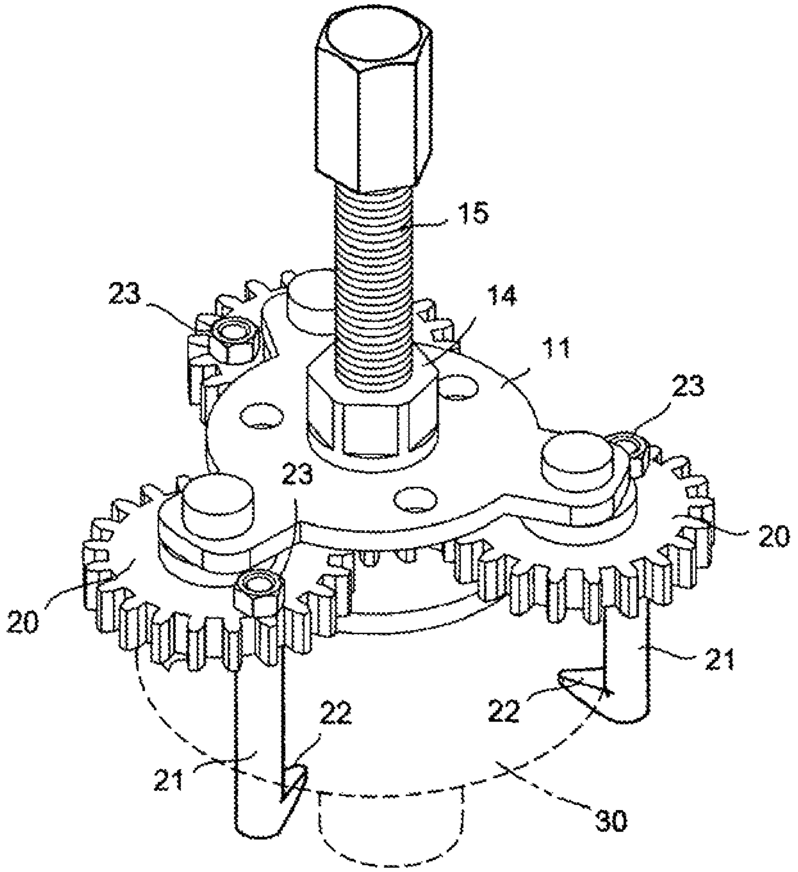
FIG. 2 is a stereogram showing a first embodiment of the present invention.

Please refer to FIG. 1 to FIG. 5 for a first embodiment of the present invention. The drawing device of the present embodiment includes a cover 10, an upper shell 11, a lower shell 12, a first driving element 14, a bolt 15, a plurality of second driving elements 20, and a plurality of clipping rods 21.

The upper and the lower shells are board-shaped and define a receiving room. The cover 10 is disposed on a side of the upper shell 11 away from the lower shell 12. The first driving element 14 and the second driving elements 20 are disposed in the receiving room respectively, and a center of each of the upper or the lower shells 11,12 forms an axle hole 13,131. In the major embodiment, the cover 10 forms a plurality of sliding slots 101. More preferably, the sliding slots extend in an arc shape.

The first driving element 14 has a first driving portion and an axle portion. An outer peripheral face of the first driving portion forms a plurality of protruding teeth annularly. The axle portion protrudes above the first driving portion and is inserted in the axle hole 13 of the upper shell 11. A cross-section of the axle portion is a polygon, more preferably a hexagon to correspond to tools which has a hexagonal cross-section. In addition, the axle portion forms a threaded hole 141 axially, and the bolt 15 is screwed with the threaded hole 141.

The second driving elements 20 are spacedly and annularly disposed on and abut against the outer peripheral face of the first driving portion. More preferably, an outer peripheral face of each second driving element 20 annularly forms a plurality of protruding teeth, so that the outer peripheral face of each second driving element 20 is engaged with the outer peripheral face of the first driving portion.

An end of each clipping rod 21 is rotatably disposed on a bottom of one of the second driving element 20, more preferably, on an off-center position of the second driving element 20. On the other hand, an end of each clipping rod 21 forms a stepped rod and penetrates one of the second driving element 20 from the bottom of the second driving element 20. Also, the clipping rod 21 protrudes above a top of the second driving element 20 in a predetermined length. In addition, a screwing element 23 is screwed with the clipping rod 21 to position the clipping rod 21 on the second driving element 20. In the major embodiment, the screwing element 23 is a nut. Besides, the other opposite end of the clipping rod 21 is bent to form a hook portion 22.

Figure 6:
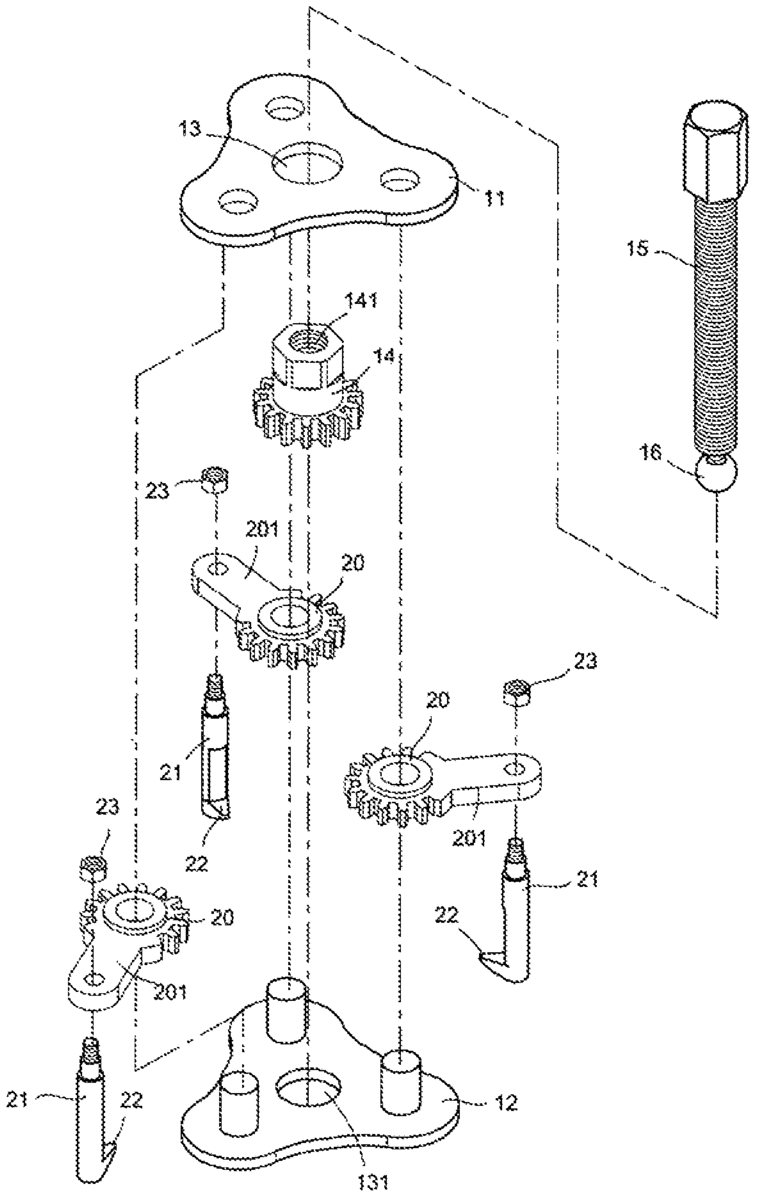
FIG. 6 is a breakdown drawing showing a second embodiment of the present invention.
Figure 7:
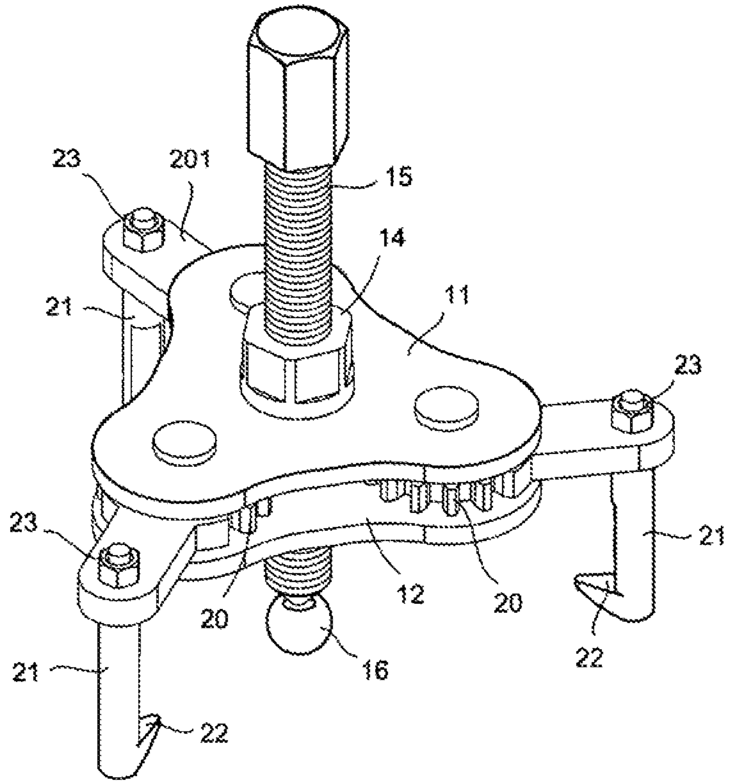
FIG. 7 is a stereogram showing a second embodiment of the present invention.
Figure 8:
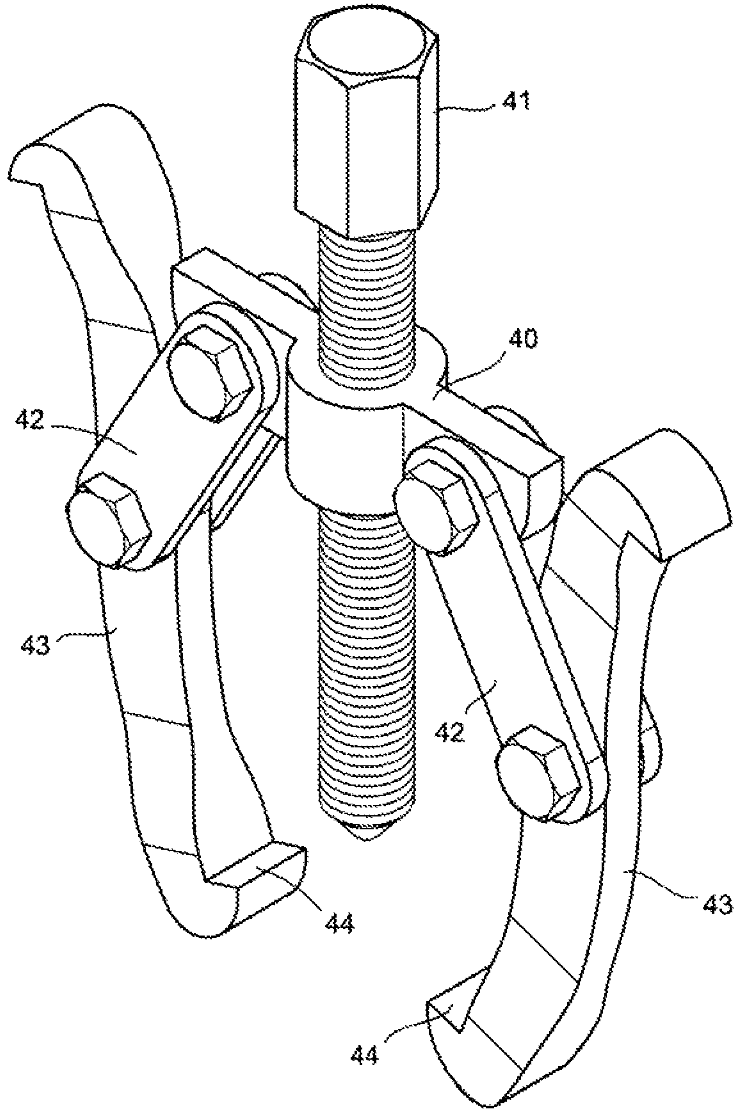
Fig. 8 PRIOR ART
FIG. 8 is a stereogram showing a conventional drawing device.
Figure 9:
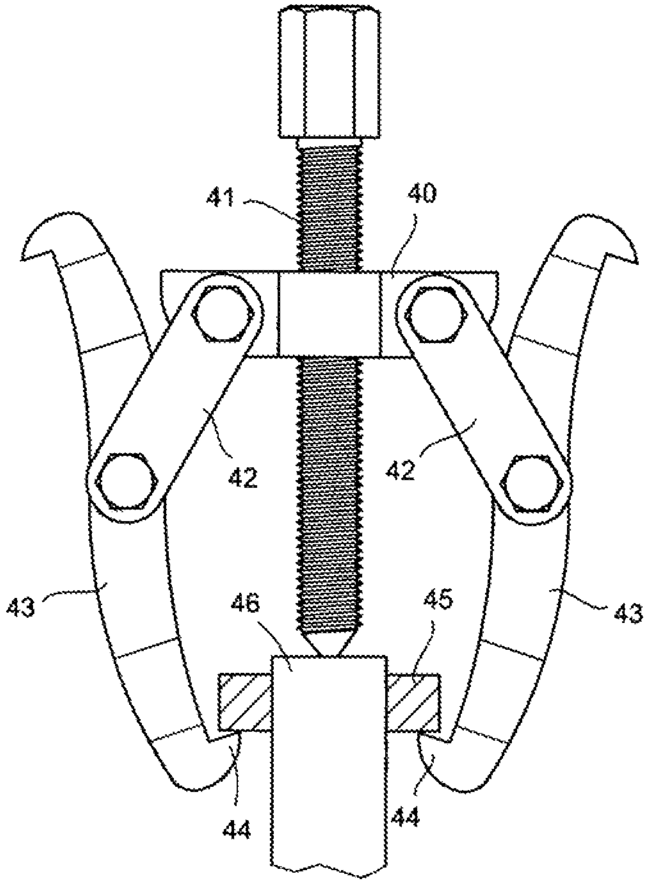
Fig. 9 PRIOR ART
FIG. 9 is an illustration of removing a work piece of a conventional drawing device.

Please refer to FIGS. 6 and 7, in the second embodiment of the present invention, each second driving element 20 includes a second driving portion and an arm 201. An outer peripheral face of the second driving portion annularly forms a plurality of protruding teeth to be engaged with the outer peripheral face of the first driving portion. The arm 201 extends from an end of the outer peripheral face, and an end of the clipping rod 21 is rotatably disposed on a free end of the arm 201. Thus, the second driving portion can be completely received in the receiving room between the upper and the lower shells, and the cover above the upper shell for safety is not necessary anymore.

Figure 3:
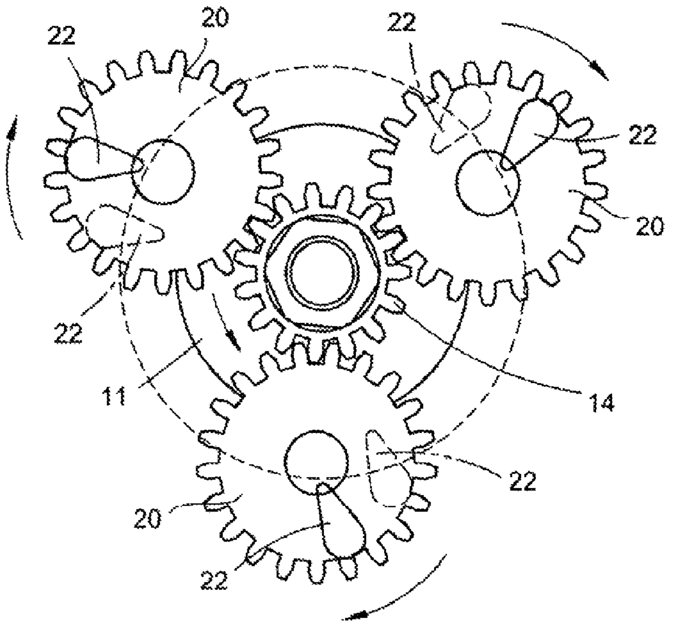
FIG. 3 is an illustration of operation showing a first embodiment of the present invention.
Figure 4:
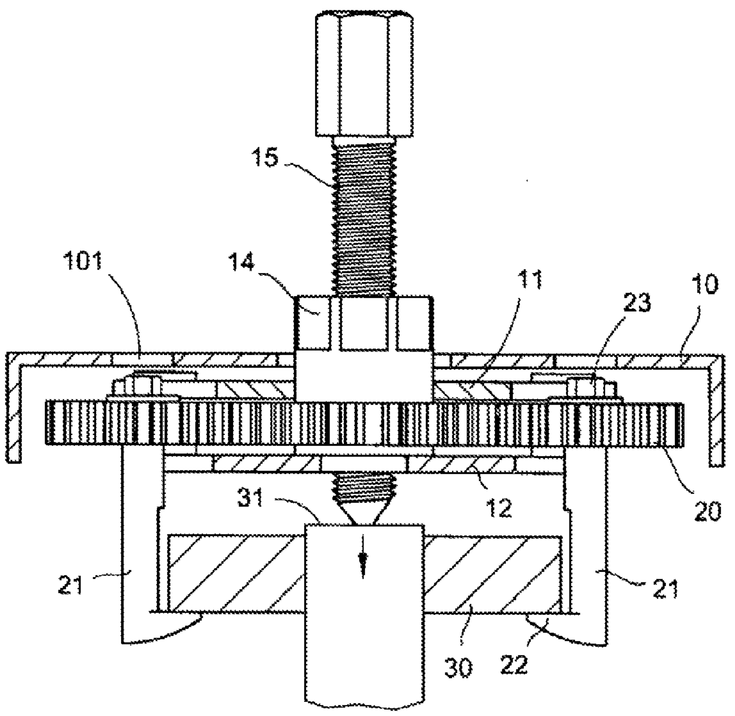
FIG. 4 is an illustration of removing a work piece of the present invention.

Please refer to FIGS. 3 and 4 for operation in the major embodiment. When rotating the bolt 15 to directly or indirectly drive the axle portion, the first driving portion, and the second driving elements 20 to rotate, the clipping rods 21 are able to be driven to shift between a first position and a second position. In other words, the clipping rods 21 are shifted in a concentric manner when the second driving elements 20 are rotated, so that a diameter which the clipping rods 21 are able to clamp can be adjusted.

Figure 5:
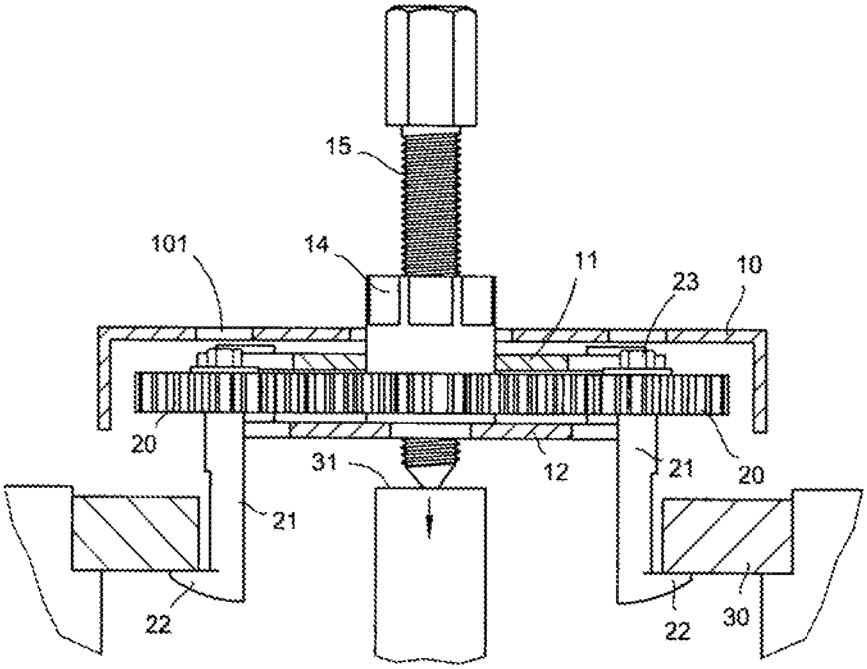
FIG. 5 is an illustration of removing an annular work piece of the present invention.

Please refer to FIGS. 4 and 5, each clipping rod 21 is able to turn relative to one of the second driving element 20 freely to enable the hook portion 22 of each clipping rod 21 to face outward or inward alternatively. In practice, the diameter which the clipping rods 21 are able to clamp is adjusted first to enable the clipping rods 21 to approach the work piece 30, and then the orientation of each hook portions 22 can be adjusted outward (as shown in FIG. 5) or inward (as shown in FIG. 4) to firmly clamp the bottom of work piece 30. Moreover, a user can rotate each screwing element with a tool which is inserted through one of the sliding hole 101 of the cover 10, so that orientation of each clipping rod 21 can be easily adjusted. More specifically, the arc shape of each sliding slot 101 corresponds to a shifting path of one of the clipping rod 21, so that adjustment becomes more convenient.

For a better performance, the second driving elements are arranged equidistantly to provide numeral co-planar positions for clamping. In practice, as shown in FIGS. 4 and 5, the bolt 15 abuts downward against a terminal end 31 of an axle on which the work piece 30 is disposed to provide a reaction force to remove the work piece 30. Generally speaking, the work piece is a bearing or an internal ring.

Besides, an unfixed terminal sheath 16 can be disposed on a lower end of the bolt 15 to prevent abrasion when the bolt 15 is rotated, as shown in FIGS. 6 and 7.

Moreover, the clipping rods are straight rod-shaped, and only a lower end of each clipping rod forms a bending hook portion. Thus, the drawing device of the present invention can be employed in a narrow space.

In addition, the second driving elements are arranged equidistantly to equalize the force for clamping exerted by each clamping position. Also, the numeral co-planar clamping positions help improve stability and safety of operation.

What is claimed is:

1. A drawing device, comprising:

a first driving element, having a first driving portion and an axle portion, the axle portion forms a threaded hole axially;

a bolt, screwed with the threaded hole;

a plurality of second driving elements, being spacedly and annularly disposed on and abutting against an outer peripheral face of the first driving portion;

a plurality of clipping rods, rotatably disposed on the second driving elements respectively, each clipping rod forms a hook portion;

wherein the bolt is able to drive the axle portion to rotate and to promote the first driving portion to rotate, the first driving portions further drive the second driving elements to rotate, the second driving elements are able to move accompanied by the clipping rods between a first position and a second position, each clipping rod is able to turn relative to the second driving elements freely to enable the hook portion of each clipping rod to face outward or inward alternatively.

2. The drawing device of claim 1, further including an upper shell, a lower shell, and a cover, the first driving element and the second driving elements being disposed between the upper and the lower shells, the cover being disposed on a side of the upper shell away from the lower shell.

3. The drawing device of claim 2, wherein the cover forms a plurality of sliding slots.

4. The drawing device of claim 3, wherein each sliding slot extends in an arc shape and corresponds to shifting paths of the clipping rods.

5. The drawing device of claim 1, wherein a plurality of protruding teeth are formed on the outer peripheral face of the first driving portion and an outer peripheral face of each second driving element respectively, so that the outer peripheral face of each second driving element is able to engaged with the outer peripheral face of the first driving portion.

6. The drawing device of claim 1, wherein each second driving element has a second driving portion and an arm, an outer peripheral face of each second driving portion forms a plurality of protruding teeth to engage with the outer peripheral face of the first driving portion, each arm extends from one of the second driving portions, an end of each clipping rod is rotatably disposed on one of the arms.

7. The drawing device of claim 1, wherein a terminal sheath is disposed on an lower end of the bolt.

8. The drawing device of claim 1, wherein an end of each clipping rod penetrates through one of the second driving element, a screwing element is screwed with an end of each clipping rod to position the clipping rod on the second driving element.

9. The drawing device of claim 1, wherein each clipping rod is located on an off-center position of one of the second driving element.

10. The drawing device of claim 1, wherein an end of each clipping rod forms a stepped rod.

* * * * *